(12) United States Patent
Ricketts et al.

(10) Patent No.: US 7,166,026 B2
(45) Date of Patent: Jan. 23, 2007

(54) STEPPED GRATE FOR AN AGRICULTURAL COMBINE

(75) Inventors: Jonathan E. Ricketts, Viola, IL (US); Kelvin Eugene Bennett, Geneseo, IL (US); Serge Deleersnyder, Oostkamp (BE)

(73) Assignee: CNH America LLC, New Holland, PA (US)

( * ) Notice: Subject to any disclaimer, the term of this patent is extended or adjusted under 35 U.S.C. 154(b) by 15 days.

(21) Appl. No.: 10/896,569

(22) Filed: Jul. 22, 2004

(65) Prior Publication Data

US 2006/0019731 A1    Jan. 26, 2006

(51) Int. Cl.
*A01F 12/24* (2006.01)
(52) U.S. Cl. ............................ 460/108; 460/66; 460/80
(58) Field of Classification Search ........... 460/46–110
See application file for complete search history.

(56) References Cited

U.S. PATENT DOCUMENTS

| | | | |
|---|---|---|---|
| 2,227,225 A * | 12/1940 | Lackey | 460/71 |
| 3,537,459 A * | 11/1970 | Thomas | 460/110 |
| 4,711,075 A | 12/1987 | Strong | |
| 4,875,891 A * | 10/1989 | Turner et al. | 460/110 |
| 4,919,641 A * | 4/1990 | Yarmashev et al. | 460/69 |
| 4,993,991 A * | 2/1991 | Yarmashev et al. | 460/66 |
| 6,358,142 B1 * | 3/2002 | Imel et al. | 460/109 |
| 6,398,639 B1 * | 6/2002 | Dammann et al. | 460/107 |
| 6,530,833 B1 * | 3/2003 | Imel et al. | 460/109 |
| 6,537,148 B1 | 3/2003 | Schwersmann | |

* cited by examiner

*Primary Examiner*—Thomas B. Will
*Assistant Examiner*—Alicia Torres
(74) *Attorney, Agent, or Firm*—Michael C. Harms; John William Stader; Stephen A. Bucchiancri

(57) ABSTRACT

A grate for an agricultural combine includes curved grate segments, each of which include mounting holes in at least one end segment. To provide a threshing grate, the end segments of the grate segments are offset to provide a "step", or discontinuity in the radius of the assembled grate, which improves the threshing efficiency of the combine. The step can be provided by offsetting mounting holes between adjacent grate segments, and securing the grates to a frame member.

10 Claims, 9 Drawing Sheets

STEPPED GRATE FOR AN AGRICULTURAL COMBINE

FIELD OF THE INVENTION

This invention relates generally to rotary combines. It relates particularly to an improved grate system in a rotary combine for more effectively separating grain and MOG (material other than grain) after it passes through the combine's threshing concave.

BACKGROUND OF THE INVENTION

Agricultural combines for harvesting and threshing of crop materials are well known in the art. Typically, agricultural combines includes a crop harvesting apparatus which reaps planted grain stalks, and an infeed mechanism arranged at the forward end of the combine to feed the grain stalks to a separating apparatus. The separating apparatus acts on the crop materials to thresh and separate grain from material other than grain (MOG).

Threshing takes place between an elongated rotor assembly and a cylindrical housing which encases the rotor assembly. The rotor assembly includes a cylindrical rotor drum having a plurality of threshing elements radiating from it. The threshing elements are mounted on the outer skin of the rotor, and may take the form of rasp bars which can be, for example, arranged in a helical path around the rotor, fastened to the outer skin of the rotor on suitably configured brackets.

The separating apparatus typically includes an axially elongated pierced casing or cage surrounding a rotor. Between the upstream and downstream ends of the separating apparatus, the crop materials are repeatedly threshed as the cage spirals around the large diameter rotor. Suitable instrumentalities on the rotor cooperate with an axially elongated threshing section on the lower portion of the casing to thresh the crop materials such that most of the grain will be separated and propelled downwardly through the threshing section. The threshing section of the casing or cage is comprised, at least in part, by a series of side-by-side semi-cylindrical perforated concaves and semi-cylindrical grates. The rotor cooperates with the semicylindrical concaves and semicylindrical grates to thresh the crop materials such that most of the grain will be separated and propelled downwardly through the concaves and grates.

During this process, the primary separation of grain from MOG is provided in the concave area. Here, the crop materials including both grain and MOG are compressed, and then rotated around the cage area, such that the easily-removed grain is threshed from the MOG. The crop material mix progresses to the semicylindrical grate area, where additional threshing is performed to separate additional remaining grain from MOG.

While prior art axial combines have been largely successful in separating grain, a significant portion of grain remains in the crop mix after the grating process. There remains a need, therefore, for an improved threshing system for separating grain from other material.

BRIEF SUMMARY OF THE INVENTION

In one aspect, the present invention provides a grate assembly for an agricultural combine. The grate assembly includes a first and a second grate member, each grate member having first and second ends and first and second curved sides. At least one of the end members of each grate member includes a mounting hole sized and dimensioned to receive a coupling element. The mounting hole in the first grate member is offset from the mounting hole in the second grate member such that, when the grate members are aligned and a coupling member is positioned between the mounting holes, the adjacent members provide a substantially semi-circular grate assembly in which the radius is discontinuous, forming a step.

In another aspect of the invention, a separating grate for an agricultural combine is provided. The separating grate includes a frame having first and second offset end members, first and second semi-circular side members extending between the offset end members, and a longitudinally-extending mounting bracket extending between the first and second semi-circular side members. The longitudinally-extending mounting bracket includes at least one mounting aperture. The separating grate further includes a first and a second grate member sized and dimensioned to be received in the frame between the first end member and the longitudinally-extending mounting bracket. The grate members each include first and second ends and first and second curved sides. At least one of the end members of each of the first and second grate member includes a mounting aperture for mounting the respective grate member to the longitudinally-extending mounting bracket. The mounting aperture in each of the first and second grate member is offset from the top of the respective end member by a different selected distance, such that when the first and second grate members are positioned in the frame member, the grate assembly includes a radius which is stepped at the interface between the first and second grate members.

In yet another aspect of the invention, an apparatus for threshing grain comprises a rotor provided in a rotor housing and a separating grate located between the rotor and the housing. The separating grate comprises at least a first and a second curved grate member, each grate member comprising first and second curved side members extending between first and second rectangular end members. In the separating grate, at least one of the end segments of the first grate member abuts at least one of the end segments of the second grate member to form a grate having a radius extending substantially around the rotor. The first grate is offset from the second grate at the abutment surface to provide a step in the radius of the separating grate at which one of the first and second grate members is radially closer to the rotor than the other of the first and second grate members.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
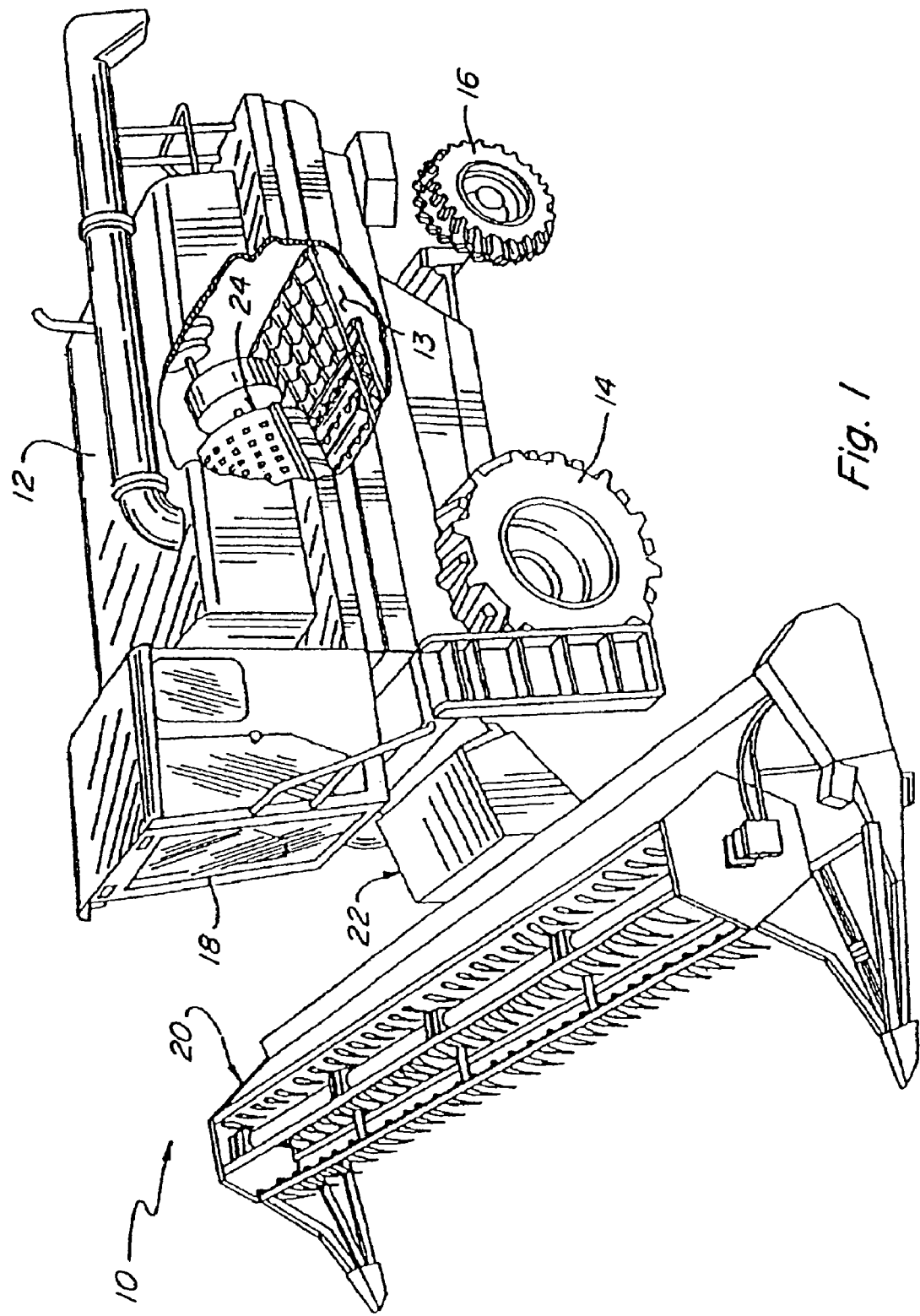
FIG. 1 is a perspective view, partially broken away, of an agricultural rotary combine.

Referring now to the figures and more particularly to FIG. 1, a typical self-propelled rotary combine 10 in which the grate of the present invention can be used is shown. The combine 10 includes a longitudinal or fore-and-aft extending frame 11 that includes a body or housing 12 defining an internal open area or space 13 and which is supported on front drive wheels 14 and steerable rear wheels 16. The combine 10 is powered by an engine (not shown) and controlled from an operator's station 18. A crop harvesting apparatus or header 20 and an infeed mechanism 22 are attached at a forward end of the combine. The infeed mechanism 22 feeds crop materials to a rotor assembly 24 enclosed within housing 12.

Figure 2:
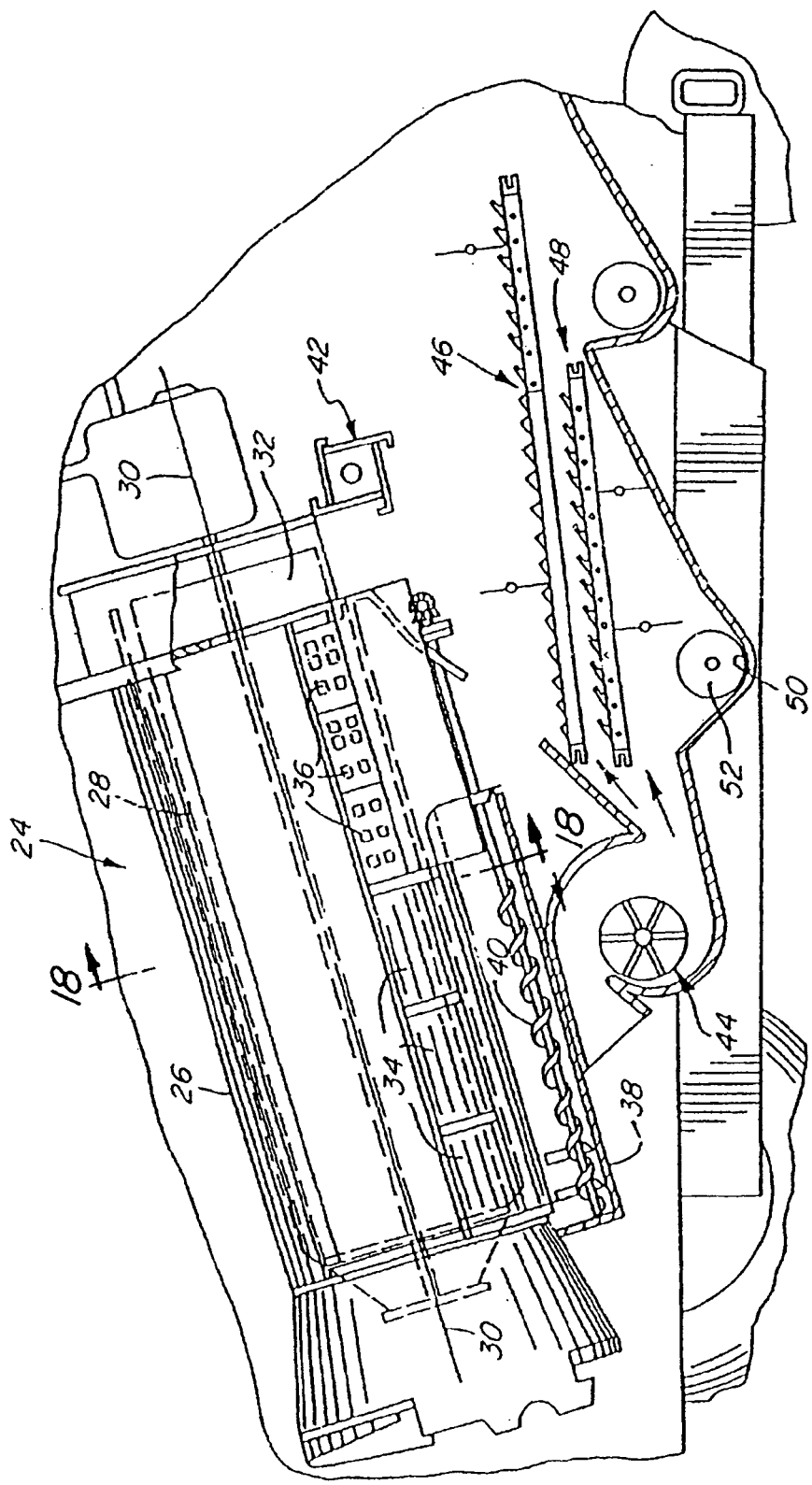
FIG. 2 is partial side view of a separating apparatus for a rotary combine.

Referring now to FIG. 2, the rotor assembly 24 threshes and separates the crop materials presented into grain and material other than grain (MOG). As shown, the rotor assembly 24 is mounted in the internal area 13 defined by housing 12 and comprises an elongated and generally cylindrical member 26 in the form of a rotor casing or cage having a rotor 28 mounted for rotation therein and about a fixed axis 30. Between the upstream and downstream ends of the rotor assembly 24, the crop material is threshed repeatedly as it spirals around the single large diameter rotor 28 and grain is permitted to pass through the bored or pierced threshing cage 26. In a conventional manner, suitable instrumentalities mounted on the periphery of the rotor 28 cooperate respectively with semicylindrical concaves 34 and semicylindrical grates 36 provided along the lower portion of the threshing cage 26 to thresh the crop materials such that most of the grain will be separated and propelled downwardly through the concaves 34 and grates 36.

Most of the grain drops onto a grain pan 38. The grain is conveyed rearwardly from the pan 38 by an auger mechanism 40 for subsequent cleaning and collection. Straw, tailings and other waste material (collectively, mog) is impelled rearwardly out of the discharge end 32 of the rotor assembly 24 where a rotary beater 42 throws the straw and other waste material rearwardly from the combine.

The combine further includes a cleaning system for cleaning chaff, straw, tailings and other foreign material from the grain. As is well known, the cleaning system includes a cleaning fan 44, a chaffer sieve 46, a grain sieve 48 and a clean grain collector 50. A suitable auger mechanism 52 directs clean grain from the collector 50 into a hopper (not shown).

Figure 3:
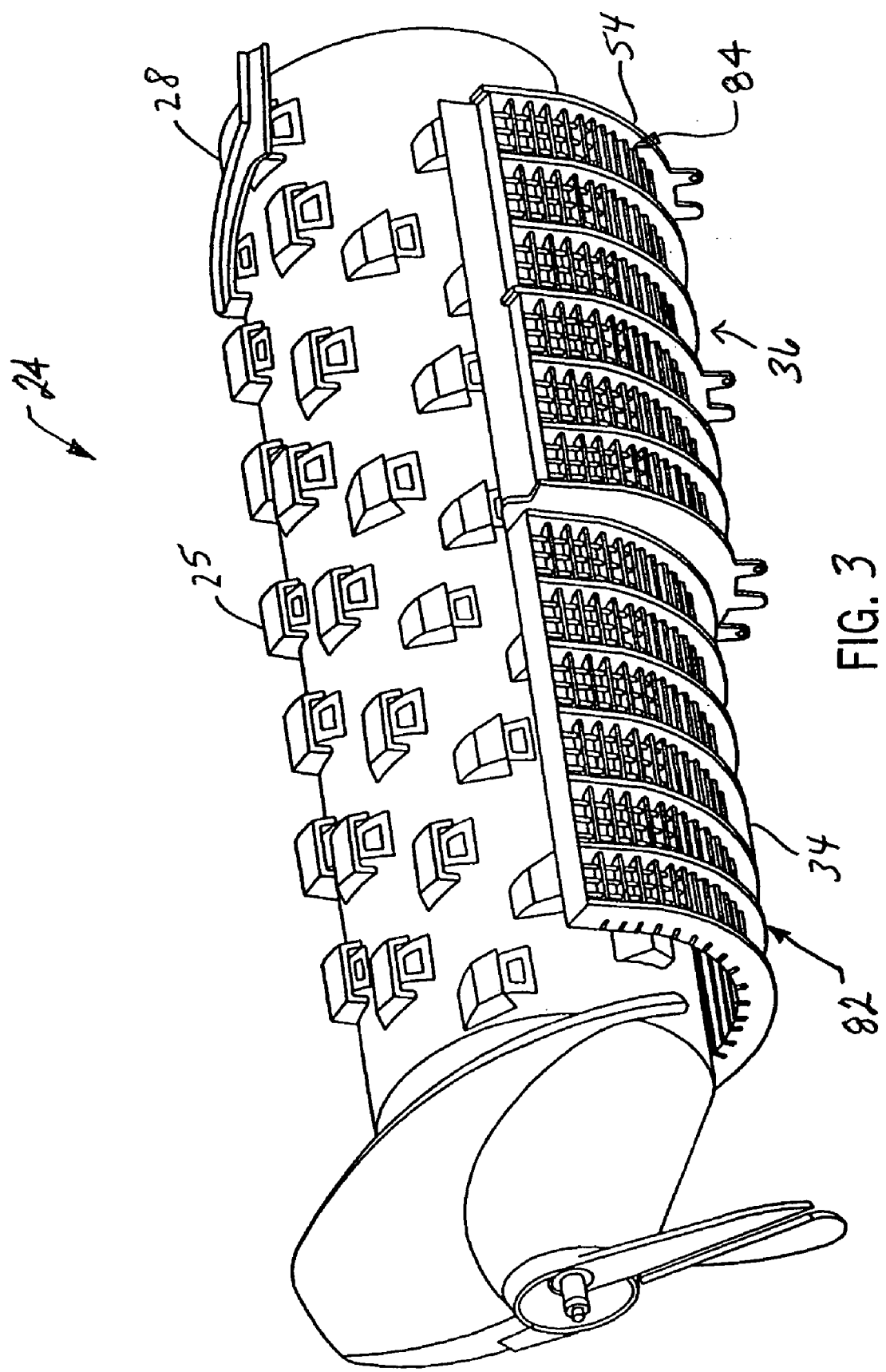
FIG. 3 is a perspective view of a rotor assembly and threshing cage constructed in accordance with the present invention.

Referring now to FIG. 3, a rotor assembly 24 constructed in accordance with the present invention is shown. As described above the rotor assembly includes a rotor 28 which is provided in a threshing cage including semicircular concaves 34 and separating grates 36. The rotor 28 includes a plurality of rasps 25 for threshing grain from a crop mat.

Figure 4:
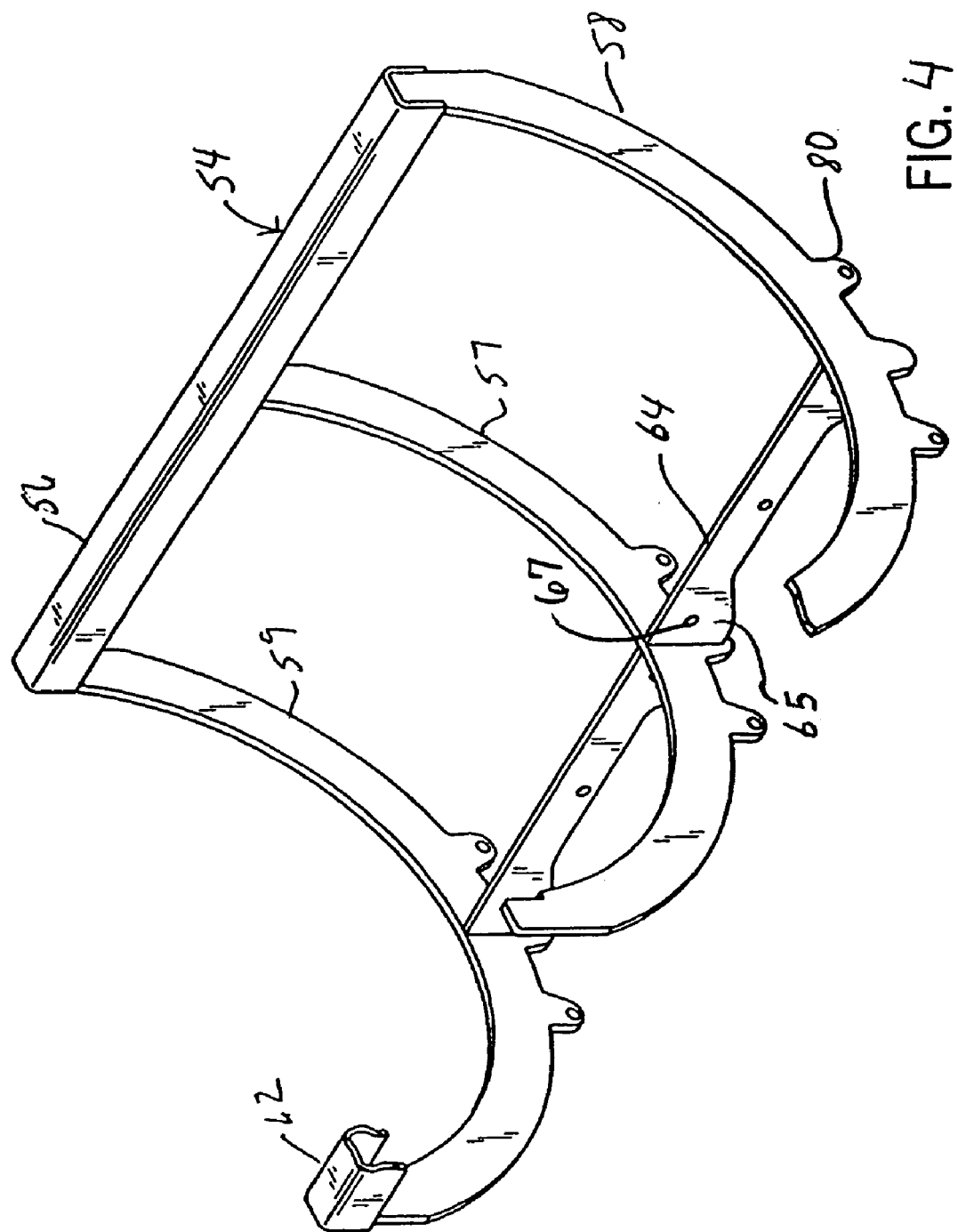
FIG. 4 is a perspective view of a frame for constructing the separating grate assembly of FIG. 3.

The semicircular concaves 34 and grates 36 have a radius greater than the rotor 28, and surround at least a portion of the rotor 28 such that, when the rotor is rotated, crop materials are threshed between the rotor 28 and the threshing concaves 34 and grates 36. Referring now specifically to the grate construction, the grate 36 comprises a frame 54 in which a plurality of grate members 82 and 84 are coupled. Referring now also to FIG. 4 the frame 54 comprises first and second end segments 56 and 62 and curved rib or side members 57, 58, and 59 which extend between the end segments 56 and 62. The end segment 56 comprises a mounting bracket for mounting the frame 54 to a rotary case assembly. Each of the semicircular rib members 58 includes a plurality of downwardly extending mounting tabs 80 including apertures for mounting the frame 54 to a rotary case assembly. A longitudinally extending bracket member 64 extends between pairs of adjacent semicircular rib members 57 and 58 and 58 and 59, respectively, and includes downwardly extending tabs 65 including apertures 67 for coupling the grate members 82 and 84 in the frame 54 as described below. Although three side members 57, 58, and 59 are shown, the number of side members provided in the frame 54 can vary depending on the number of grate members used in the threshing operation.

Figure 5:
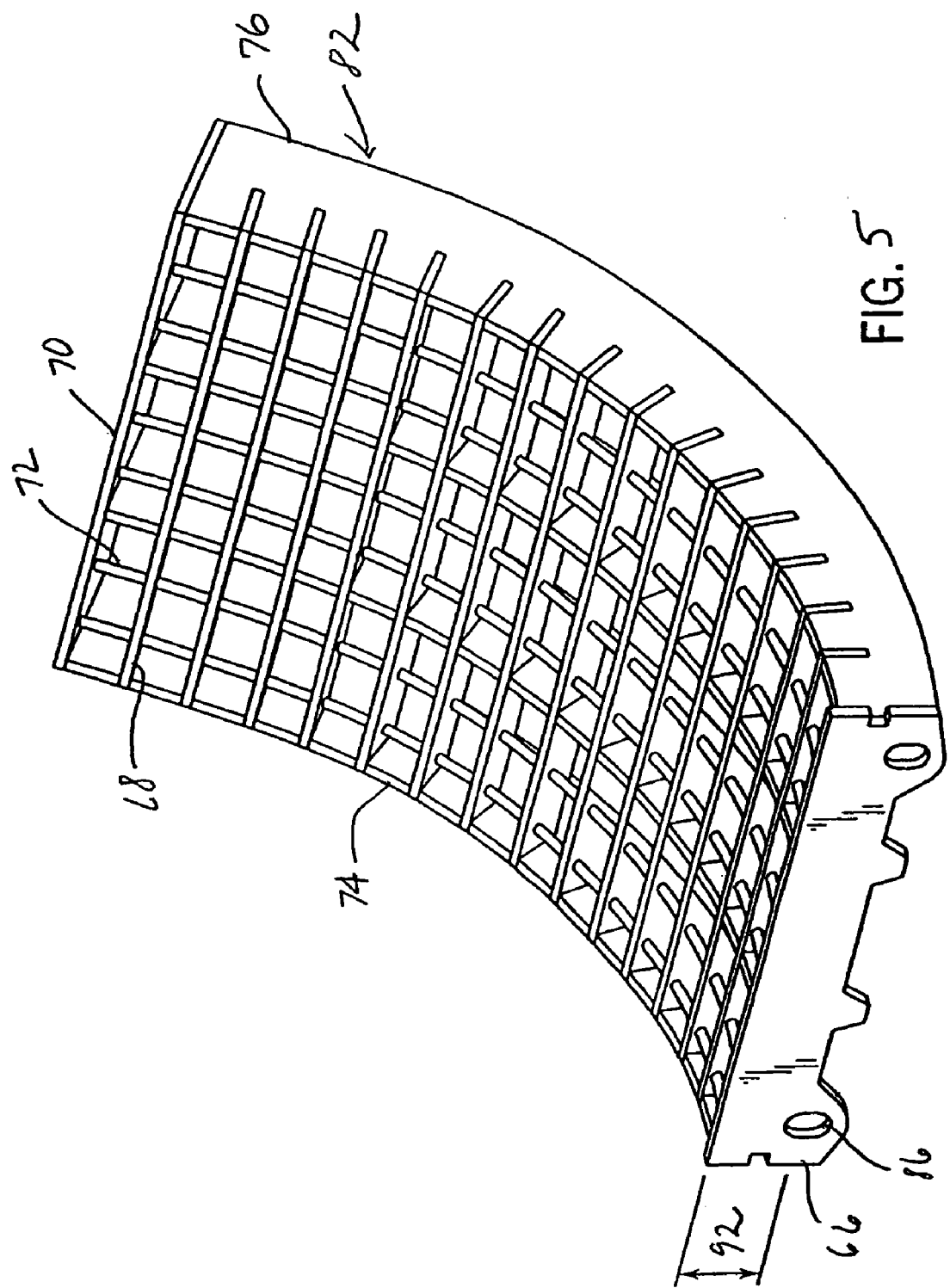
FIG. 5 is a perspective view of a first grate member for receipt in the frame of FIG. 4.
Figure 6:
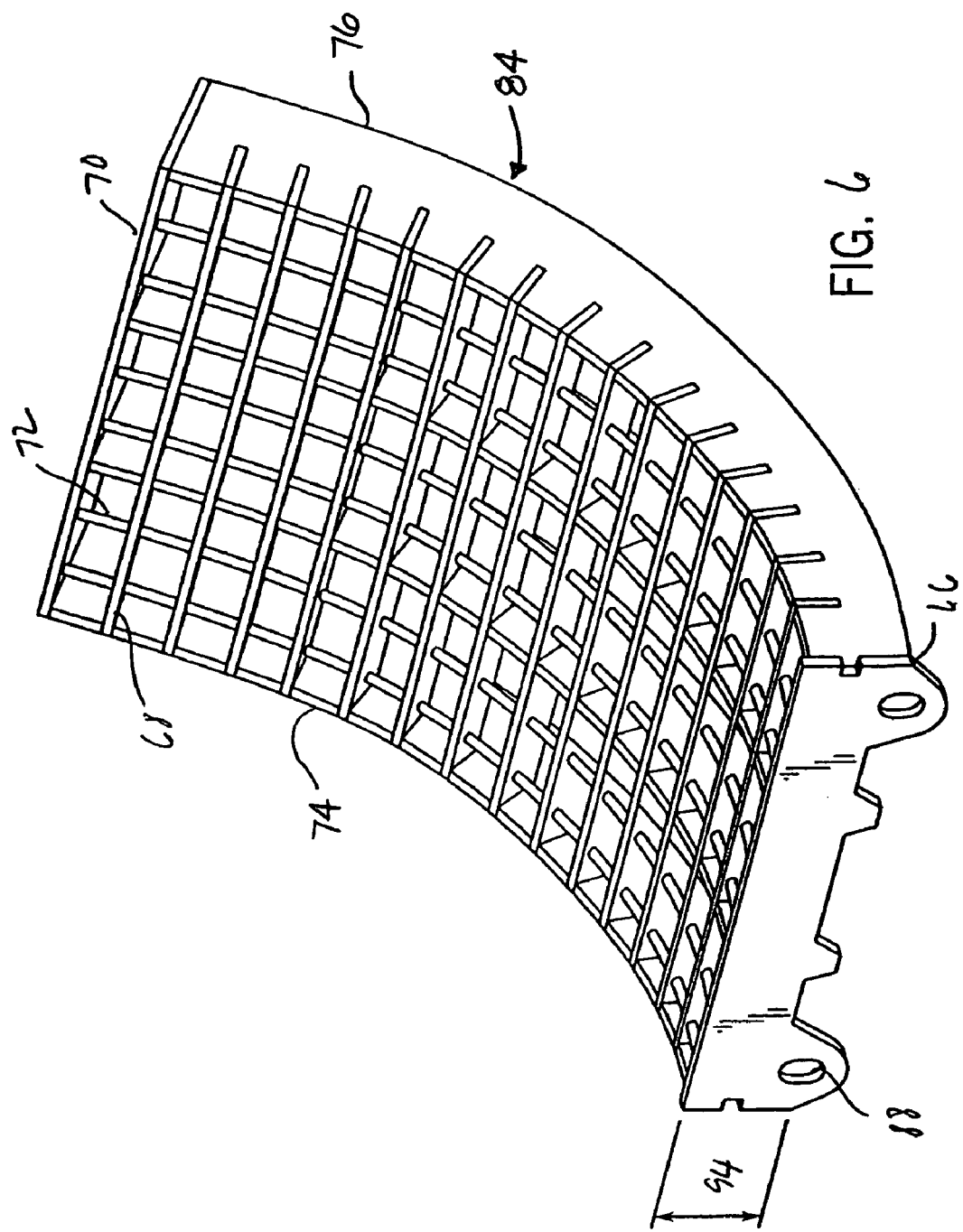
FIG. 6 is a perspective view of a second grate member for receipt in the frame of FIG. 4.

Referring now to FIGS. 5 and 6, grate members 82 and 84, which are sized and dimensioned to be received in the frame 54 are shown. Each of the grate members 82 and 84 include a first end member 66, a second end member 70, and substantially parallel curved side member 74 and 76 extending between the end members 66 and 70. The radius of curvature of the side members 74 and 76 is substantially equivalent to that of the side members 57, 58, and 59 of the frame 54 described above. Between the end members 66 and 70 and side members 74 and 76, the grate construction is formed by a combination of parallel, longitudinally extending bar members 72 and transversely extending rib members 68. The bar members 72 extend between the end members 66 and 70, and are substantially parallel to the side members 74 and 76. The rib members 68 extend across the respective grate 82, 84 from side member 74 to side member 76. Each of the rib members 68 and bar members 72 are substantially evenly spaced to provide the grid or grate construction. While a grid or grate construction of individual crossed members 68 and 72 is shown, various other methods of producing the grate construction, including piercing a plurality of apertures in a plate, can also be used.

Figure 7:
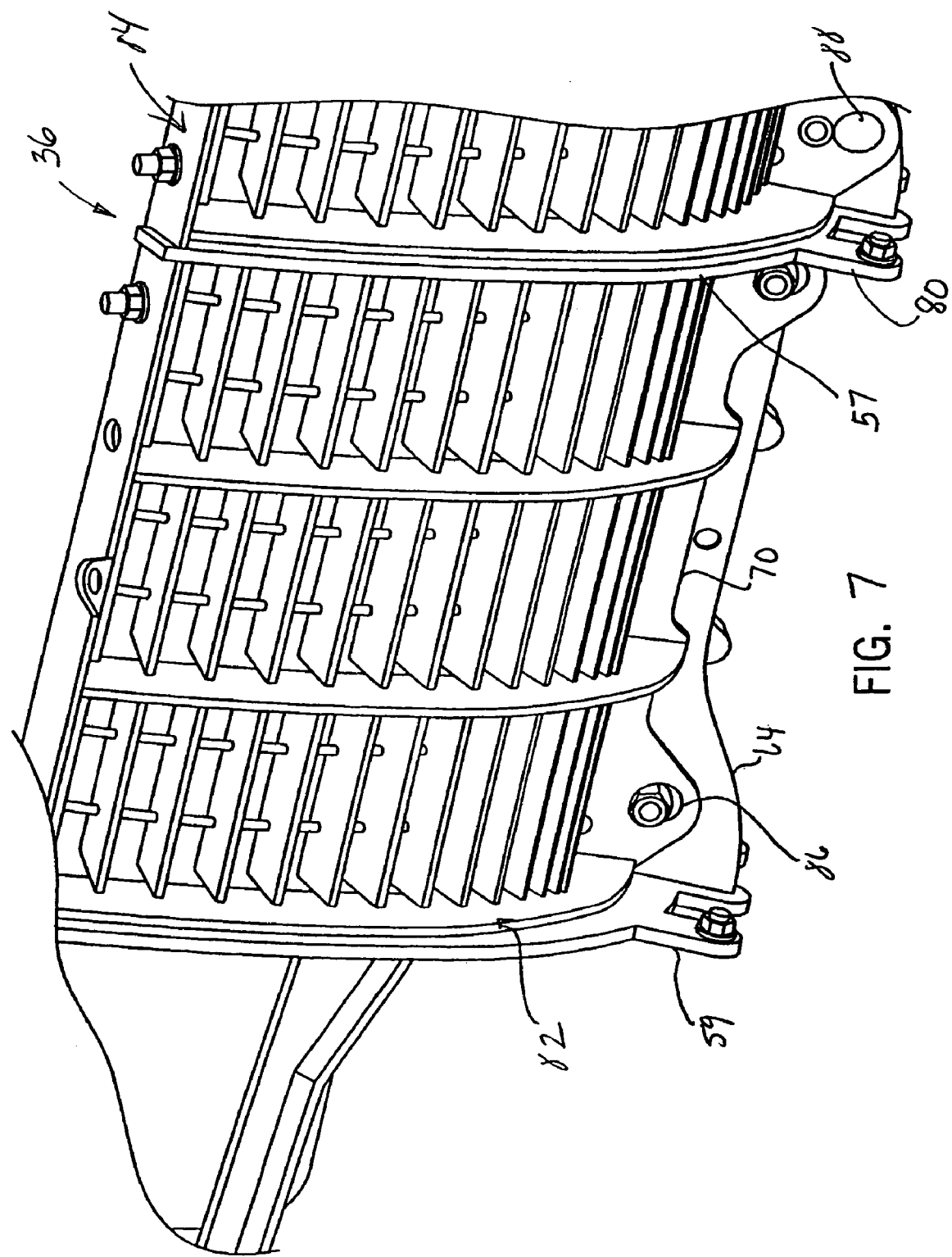
FIG. 7 is a partial close-up view of the separating grate assembly mounted to the rotor as shown in FIG. 3.

Referring still to FIGS. 5 and 6, the end members 66 and 70 of each of the grate members 82 and 84 include mounting apertures 86 and 88, respectively, for mounting the grate members 82 and 84 to the frame 54 (see FIG. 7). A distance 92 between the top edge of the end segment 66 of the grate member 82 and the mounting hole 86 (see FIG. 5) is smaller than a distance 94 between the top of the end segment 66 and the mounting hole 88 in the grate member 84 (see FIG. 6). When installed in the frame 54, as shown in FIG. 8, this difference in location between the mounting holes 86 and 88 causes a "step" to be provided in the radius between the adjacent grate members 82 and 84.

Referring now to FIG. 7, as described above, the grate members 82 and 84 are shown coupled to the frame member 54 to form the separating grate 36. The first grate member 82 is shown mounted between rib members 57 and 59, and includes mounting apertures 86 which are provided at the distance 92 (see FIG. 5) from the top of the end members 66 and 70. The second grate member 84 is provided between rib members 57 and 58 (FIG. 4) and includes the mounting aperture 88 which is offset at the second distance 94 (see FIG. 6) and which, therefore, provides a "step" in the radius of the assembled grate 36.

Figure 8:
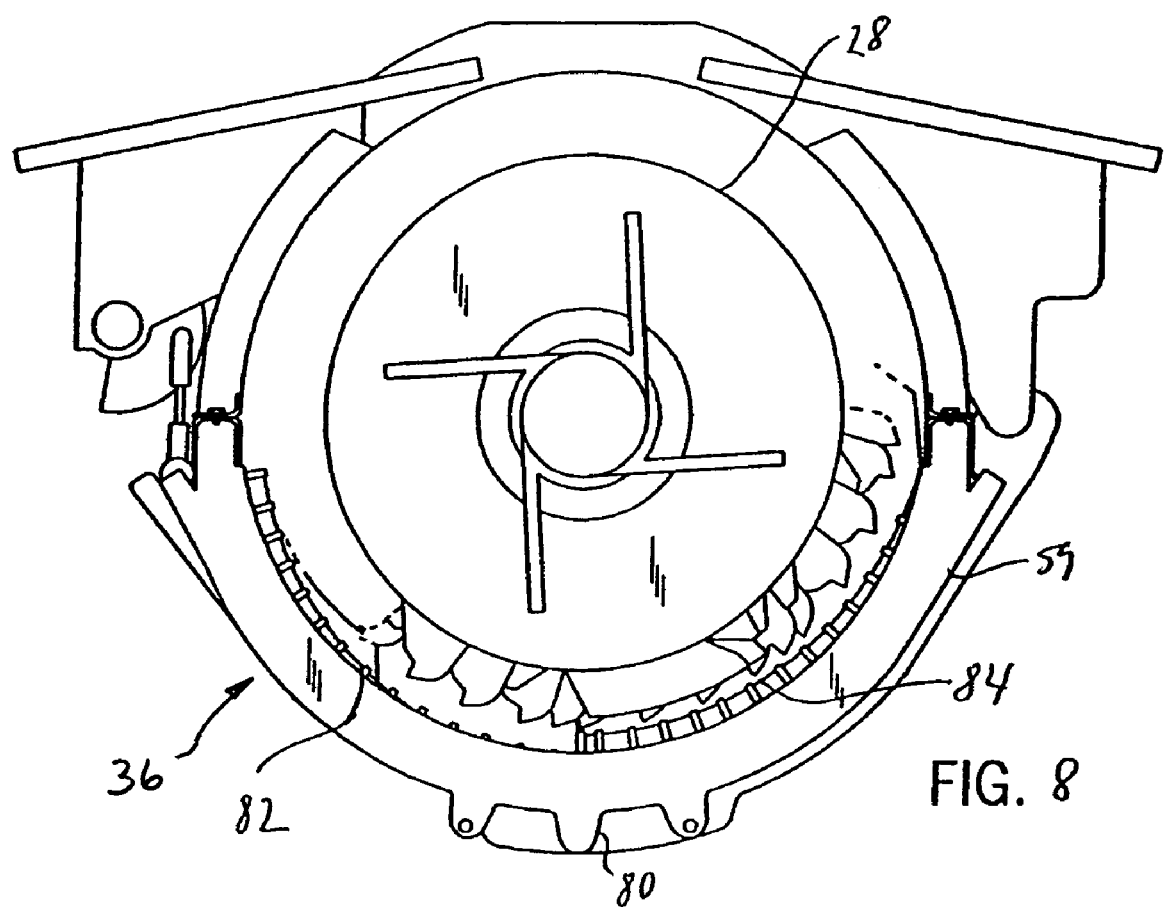
FIG. 8 is a rear view of the rotor assembly of FIG. 3 as assembled in a combine.
Figure 9:
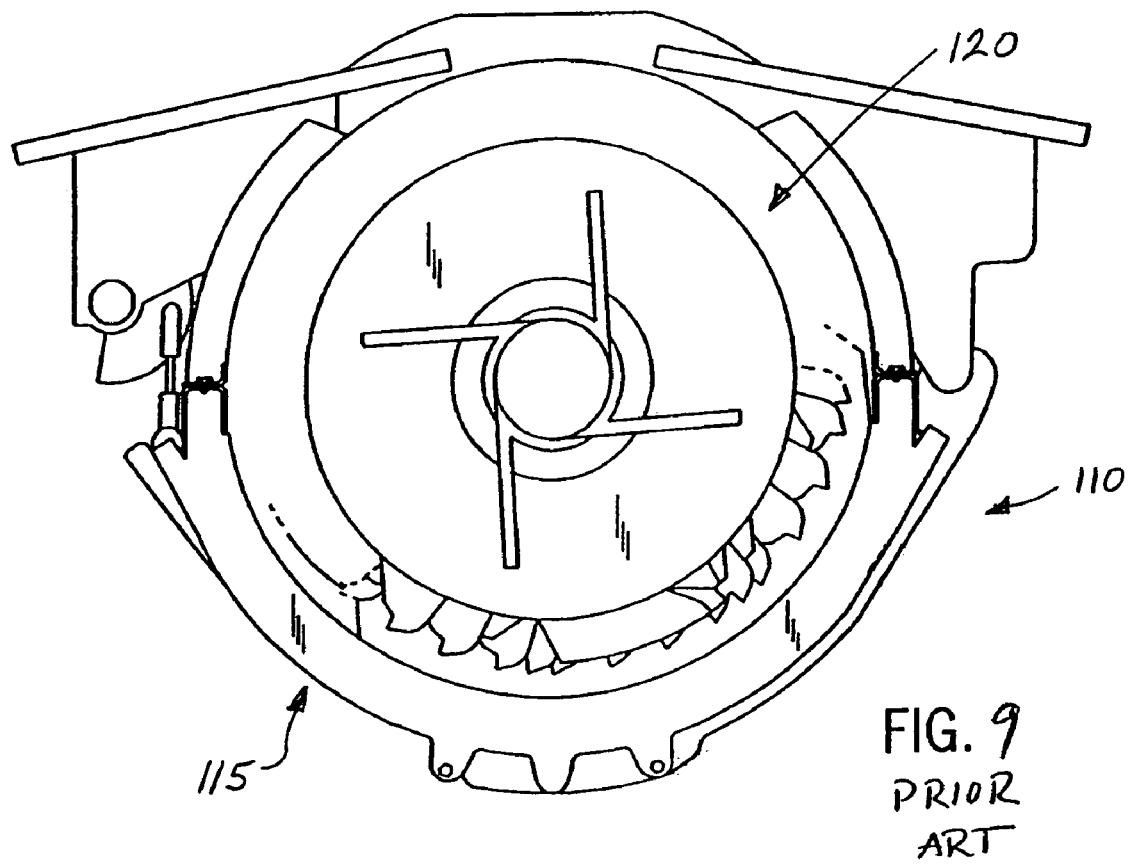
FIG. 9 is a rear view of a rotor assembly of a typical prior art combine taken from the same angle as FIG. 8.

FIG. 8 illustrates a rear view of the rotor assembly 28 grates illustrating the relative position of grate members 82 and 84 the cage assembly constructed in accordance with the present invention for comparison to a typical prior art assembly 110 illustrated in FIG. 9. Referring first to the typical prior art assembly 110 shown in FIG. 9, a separating grate 115 is radically offset from and substantially equidistant to a rotor 120. Referring now to FIG. 8 and the separating grate 36 constructed in accordance with the present invention, a discontinuity in the radial distance from the rotor 28 to the grate 36 is produced as a "step". Here, on the left hand side, the grate member 82 follows a radius of curvature substantially equidistant from the rotor 28. On the right hand side, the grate member 84 is offset from the grate member 82; such that the discontinuity or "step" is formed. At the step, the distance between the rotor 28 and the grate 36 is decreased, such that the grate member 84 is closer to the rotor 28 then the grate member 82.

While the invention has been described as providing a single step, it will be apparent that grates having a plurality of steps could be constructed in a similar manner. Moreover, the size of the steps can be easily varied by changing the reparation distance between the grates.

It should be understood that the methods and apparatuses described above are only exemplary and do not limit the scope of the invention, and that various modifications could be made by those skilled in the art that would fall under the scope of the invention. To apprise the public of the scope of this invention, the following claims are made:

The invention claimed is:

1. A grate for an agricultural combine comprising:
a frame including first and second offset end members and first, second and third semi-circular side members extending between the offset end members, wherein the second semi-circular side member is disposed in between the first and third semi-circular side members;
a longitudinally-extending mounting bracket extending between the first and, second and third semi-circular side members at a position between the first and second end members, the longitudinally-extending mounting bracket including at least one mounting aperture;
a first grate member including first and second ends and first and second curved sides which extend between first and second ends of the first grate member, the first grate member is disposed between the first and second semi-circular side members, the first grate member is sized and dimensioned to be received in the frame between at least one of the first and second end members and the longitudinally-extending mounting bracket, the end member of the first grate member mounted to the mounting bracket including a mounting aperture for mounting the first grate member to the longitudinally-extending mounting bracket, the mounting aperture being offset from the top of the respective end member of the first graze by a first selected distance; and
a second grate member including first and second ends and first and second curved sides which extend between the first and second ends of the second grate member, the second grate member is disposed between the second and third semi-circular side members, the second grate member is sized and dimensioned to be received in the frame between at least one of the first and second end members and the longitudinally-extending mounting bracket, end member of the second grate member mounted to the mounting bracket including a mounting aperture for mounting the second grate member to the longitudinally-extending mounting bracket, the mounting aperture being offset from the top of the respective end member of the second grate by a second selected distance;
wherein the first selected distance is smaller than the second selected distance such that when the first and second grate members are positioned in the frame member, the end member of the second grate member mounted to the mounting bracket is stepped upward from the end member of the first grate member mounted to the mounting bracket.

2. The grate as defined in claim 1, wherein the end segment of each of the first and second grate members includes a mounting tab extending away from the grate member, the mounting tab comprising the mounting aperture for receiving a fastener.

3. The grate as defined in claim 1, wherein the frame comprises a plurality of longitudinally-extending mounting brackets spaced along the side members and between the first and second ends of the frames, and a plurality of grate members sized and dimensioned to be positioned between adjacent pairs of longitudinally-extending mounting brackets.

4. The grate as defined in claim 1, wherein the end segments of the first and second frame members are substantially rectangular.

5. The grate as defined in claim 1, wherein the first and second grate members each comprise a plurality of apertures.

6. The grate as defined in claim 1, wherein the first and second grate members each include a plurality of ribs that are substantially parallel to the curved side segments and a plurality of longitudinally extending bar members that arc substantially parallel to the end segments, the ribs and bar members together forming a grid including a plurality of apertures.

7. The grate as defined in claim 1, wherein the longitudinally-extending mounting bar includes downwardly extending tabs each including the at least one aperture for coupling the first grate member and the second grate member to the frame.

8. A grate for an agricultural combine, comprising:
a frame including a first and a second semi-circular side member extending between a first and a second end member, and a longitudinally extending mounting bracket extending between the first and second side members at a position between the first and second end members, the bracket including a plurality of mounting aperture;
a first grate member having first and second ends and first and second semi-circular sides extending between the first and second ends, the second end including a mounting aperture for mounting the first grate member to the mounting bracket, the mounting aperture being offset from the top of the second end of the first grate member by a first distance; and
a second grate member having first and second ends and first and second semi-circular sides extending between the first and second ends, the second end including a mounting aperture for mounting the second grate member the mounting bracket, the mounting aperture being offset from the top of the second end of the second grate member by a second distance, wherein the first distance is smaller than the second distance such that when the first and second grate members are positioned side-by side to each other within the frame, a step is formed between the second end of the first grate member and the second end of the second grate member.

9. The grate as defined in claim 8, wherein each of the grate members comprises a plurality of ribs extending between the first and second ends and parallel to the sides and a plurality of transverse crass members extending from the first side to the second side.

10. The grate as defined in claim 8, wherein each of the grate members comprises a pierced plate.

* * * * *